(12) United States Patent
Faust

(10) Patent No.: US 8,930,103 B2
(45) Date of Patent: Jan. 6, 2015

(54) CONTROL METHOD FOR A DUAL-CLUTCH TRANSMISSION

(71) Applicant: GETRAG Getriebe- und Zahnradfabrik Hermann Hagenmeyer GmbH & Cie KG, Untergruppenbach (DE)

(72) Inventor: Hartmut Faust, Bühl (DE)

(73) Assignee: GETRAG Getriebe- und Zahnradfabrik Harmann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 14/193,140

(22) Filed: Feb. 28, 2014

(65) Prior Publication Data

US 2014/0249727 A1    Sep. 4, 2014

(30) Foreign Application Priority Data

Mar. 4, 2013   (DE) .......................... 10 2013 003 520

(51) Int. Cl.

| | |
|---|---|
| *B60W 10/02* | (2006.01) |
| *B60W 10/06* | (2006.01) |
| *B60W 10/113* | (2012.01) |
| *B60W 10/18* | (2012.01) |
| *F16H 61/688* | (2006.01) |

(52) U.S. Cl.
CPC ................................... *F16H 61/688* (2013.01)
USPC ............................... 701/58; 477/94; 477/115

(58) Field of Classification Search
USPC .................... 701/58, 68, 53; 477/79, 115, 94
See application file for complete search history.

(56) References Cited

U.S. PATENT DOCUMENTS

| | | | |
|---|---|---|---|
| 7,139,654 B2 | 11/2006 | Fidlin et al. | |
| 7,325,291 B2 | 2/2008 | Abnert | |
| 8,364,361 B2 * | 1/2013 | Olson et al. | ..................... 701/60 |

(Continued)

FOREIGN PATENT DOCUMENTS

| | | |
|---|---|---|
| DE | 10235256 A1 | 2/2003 |
| DE | 102006002490 A1 | 8/2006 |

OTHER PUBLICATIONS

German Search Report dated Nov. 27, 2013, 5 pages.

*Primary Examiner* — Edwin A Young
(74) *Attorney, Agent, or Firm* — Reising Ethington P.C.

(57) ABSTRACT

A method for controlling a drivetrain of a motor vehicle. The vehicle comprises a drive engine and a dual-clutch transmission. The dual-clutch transmission comprises a first friction clutch and a second friction clutch together with a first transmission unit and a second transmission unit, in order to establish a first power transmission branch and a second power transmission branch. The dual-clutch transmission comprising a clutch actuator device for actuating the friction clutches and a gearshift actuator device for engaging and disengaging gears of the dual-clutch transmission. The method assuming that the motor vehicle is being driven in a high original gear and comprising the following steps: derivation of a first shift signal from an actuation of a control element by the driver; calculation of a target gear, which is lower than the original gear and which corresponds to the first shift signal; selection of an intermediate gear between the original gear and the target gear, opening of the friction clutch corresponding to the original gear and closing of the friction clutch corresponding to the intermediate gear, in order to transmit drive power via the power transmission branch corresponding to the intermediate gear; and engagement of the target gear, opening of the friction clutch corresponding to the intermediate gear and closing of the friction clutch corresponding to the target gear in the event that a second shift signal is derived from an actuation of a control element by the driver.

12 Claims, 5 Drawing Sheets

(56) References Cited

U.S. PATENT DOCUMENTS

| | | |
|---|---|---|
| 2005/0126877 A1 | 6/2005 | Schneider et al. |
| 2007/0254775 A1* | 11/2007 | Kishi .......................... 477/115 |
| 2010/0114443 A1* | 5/2010 | Terwart et al. ................. 701/68 |
| 2012/0316738 A1* | 12/2012 | Teslak et al. .................... 701/53 |

* cited by examiner

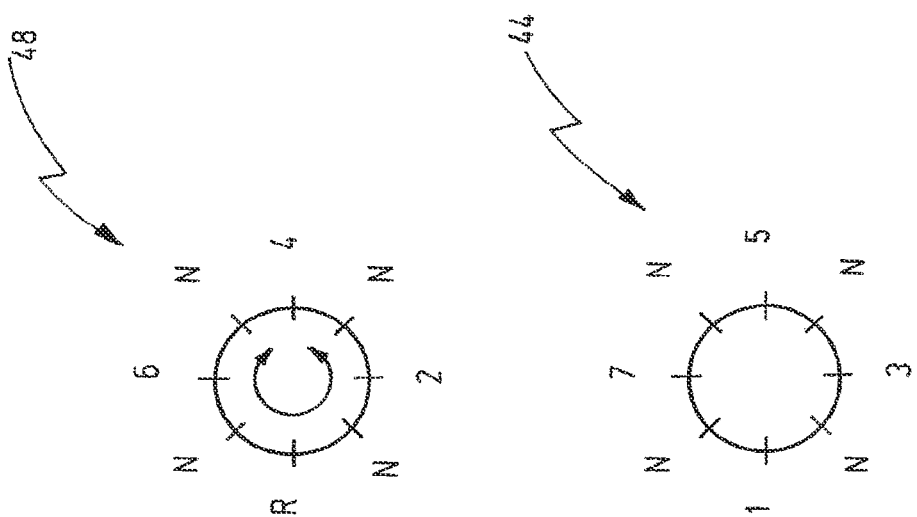
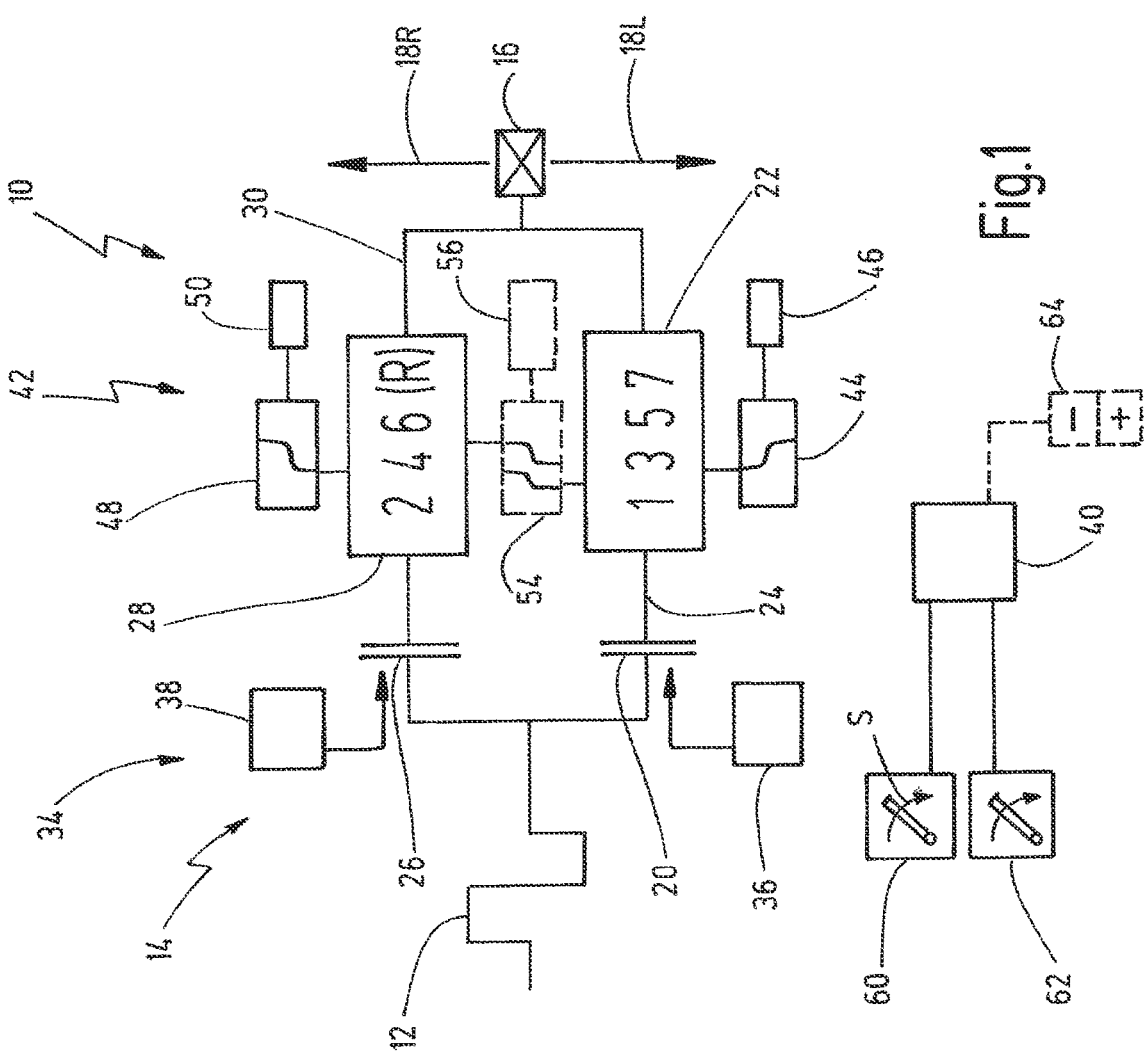
Fig.1
Fig.2

CONTROL METHOD FOR A DUAL-CLUTCH TRANSMISSION

CROSS REFERENCES TO RELATED APPLICATIONS

This application claims the priority of German patent application DE 10 2013 003 520, filed Mar. 4, 2013, which is incorporated herein by reference.

BACKGROUND OF THE INVENTION

The present invention relates to a method for controlling a drivetrain of a motor vehicle, which comprises a drive engine and a dual-clutch transmission, the dual-clutch transmission comprising a first friction clutch and a second friction clutch together with a first transmission unit and a second transmission unit, in order to establish a first power transmission branch and a second power transmission branch, the dual-clutch transmission comprising a clutch actuator device for actuating the friction clutches and a gearshift actuator device for engaging and disengaging gears of the dual-clutch transmission.

Drivetrains having such dual-clutch transmissions are generally known. Here, through overlapping actuation of the two friction clutches, drive power can be transferred from the one power transmission branch to the other power transmission branch without any interruption in tractive force. The one transmission unit generally contains the odd gears and the other transmission unit the even gears. The reverse gear is also preferably integrated into the transmission unit with the even gears.

The clutch actuator device may comprise electric motors as actuators. It is preferable, however, if the friction clutches are each actuated by means of suitable hydraulic actuators.

The gearshift actuator device may likewise comprise hydraulic actuators. The provision of a gearshift hydraulic cylinder as actuator for each shift clutch assembly (which comprises two adjacent shift clutches in each case) is known in this case. Also known is the use of electric motors for actuating the shift clutches of the transmission units. Here the gearshift electric motors may be arranged concentrically with the shift clutch.

In a further known embodiment the gears of the dual-clutch transmission are actuated by means of at least one shift drum. Here the shift drum is preferably driven by means of an electric motor, but it may also be driven by a hydraulic drive.

In a variant the dual-clutch transmission comprises just one shift drum. In this embodiment the gear changes are as a rule purely sequential. Multiple gear shifts through one or more gears are in this case relatively time-consuming.

In a further variant the provision of a separate shift drum for each transmission unit is known, the shift drums being capable of actuation independently of one another. In this embodiment, too, a problem remains with regard to the relatively long shifting times when shifting through multiple gears.

The present control method assumes a state in which the vehicle is operated with a high original gear. If multiple downshifting from this initial state is required, for example in the event of a kickdown or a braking process, with dual-clutch transmissions, the gearshift actuator device of which comprises one or two shift drums, relatively long delays may occur until the correct gear is engaged.

In the event of a kickdown, in which a specific travel of the accelerator pedal is generally reached or exceeded, a lowest possible target gear is calculated on the basis of the prevailing driving condition. The downshift from the high original gear into the lowest possible target gear is then performed, which in some cases can take a relatively long time, however, and is not desirable especially when embarking upon overtaking maneuvers or the like.

SUMMARY OF THE INVENTION

Against this background an object of the invention is to specify an improved control method for a dual-clutch transmission drivetrain, which will serve, in particular, to improve comfort.

The aforementioned object is achieved by a method for controlling a drivetrain of a motor vehicle, which comprises a drive engine and a dual-clutch transmission, the dual-clutch transmission comprising a first friction clutch and a second friction clutch together with a first transmission unit and a second transmission unit, in order to establish a first power transmission branch and a second power transmission branch, the dual-clutch transmission comprising a clutch actuator device for actuating the friction clutches and a gearshift actuator device for engaging and disengaging gears of the dual-clutch transmission, said method assuming that the motor vehicle is being driven in a high original gear and comprising the following steps:

derivation of a first shift signal from an actuation of a control element by the driver;

calculation of a target gear, which is lower than the original gear and which corresponds to the first shift signal;

selection of an intermediate gear between the original gear and the target gear, opening of the friction clutch corresponding to the original gear and closing of the friction clutch corresponding to the intermediate gear, in order to transmit drive power via the power transmission branch corresponding to the intermediate gear;

engagement of the target gear, opening of the friction clutch corresponding to the intermediate gear and closing of the friction clutch corresponding to the target gear in the event that a second shift signal is derived from an actuation of a control element by the driver.

The present control method assumes that the motor vehicle is being driven in a high original gear, that is to say in particular the highest gear of the dual-clutch transmission, or the second highest or third highest gear of the dual-clutch transmission. In particular, the present control method further assumes such a driving mode in which the original gear is used in a relatively low vehicle speed range, in such a way that from this driving mode it is possible to shift down at least two, but preferably three or even more gears without reaching the engine-speed limit in the target gear.

Here the speed of the motor vehicle may lie particularly in the range from 30 to 130 km/h, preferably in the range from 30 to 100 km/h and in particular in the range from 30 to 80 km/h.

The drive engine of the drivetrain used in the control method is preferably an internal combustion engine, the drive engine also possibly being embodied as a hybrid engine. In some cases it is furthermore possible to connect an input of the dual-clutch transmission to an electric machine, in order to thereby furnish a hybrid drivetrain.

The actuation of the control element by the driver communicates an intended downshift to a control device, or such an intended downshift can be derived from this actuation. From this the control device generates a first shift signal The target gear resulting from the first shift signal is preferably the lowest possible gear for the state prior to the actuation of the control element. It should thereby generally be possible to provide a maximum possible tractive or overrun torque in the target gear thus calculated. As stated, the target gear is at least two gears lower than the original gear (for example original gear 7 and target gear 5, in such a way that an intermediate gear can still be engaged between these gears).

It is especially preferred if the target gear calculated is at least three gears, in particular four gears lower than the original gear A generally known practice, particularly in dual-clutch transmissions, the gearshift actuator device of which comprises a shift drum, is briefly to engage all intervening gears in such a multiple downshift and also to connect these to the output of the motor vehicle (the driven wheels) through an overlapping actuation of the friction clutches. However, the time taken to reach the target gear is relatively high, particularly in the case of larger multiple downshifting. The same problem can occur if the gearshift actuator device comprises two shift drums.

In dual-clutch transmissions, the gearshift actuator device of which comprises individual shift cylinders that can be controlled independently of one another, this problem is generally not very pronounced.

The present invention assumes that on the way from the original gear into the target gear an intermediate gear is engaged and is connected to the output. Owing to the fact that many modern drive engines already provide a relatively high torque at relatively low engine speeds and over a relatively large engine speed range, in many cases the tractive or overrun torque that can be furnished via the intermediate gear may then be sufficient for the driver's intentions.

If, for example, a driver driving slowly at low revs in a high original gear (for example gear 7) actuates a control element so that a low target gear (for example gear 3) is calculated from this, an intermediate gear such as the gear 4, for example, is first engaged and drive power is transmitted to the output via the intermediate gear. In many cases the drive torque obtainable via the intermediate gear will be sufficient for the driver's intentions.

In these cases further downshifting from the intermediate gear into the target gear would be superfluous.

The present control method consequently assumes that the target gear is engaged and the drive power transmitted to the power branch corresponding to the target gear, only if a second shift signal is derived from an actuation of a control element by the driver.

Consequently in the method according to the invention it is queried whether the driver, as it were, "confirms" the intended downshift from which the target gear has been calculated.

Here the derivation of the second shift signal can be inferred from the manner and/or the duration of the actuation of the control element by the driver. It is also possible for the driver to actuate the same or a different control element in a confirmatory manner following the first actuation of the control element.

In many cases unnecessary gear shifts, which might also lead to time delays, can thereby be avoided.

The object is therefore achieved in full.

In the control method according to the invention it is especially preferred if, at least, the friction clutch corresponding to the intermediate gear is not opened and the friction clutch corresponding to the target gear is not closed, unless a second shift signal is derived from an actuation of a control element by the driver within a preset period of time following the derivation of the first shift signal.

This embodiment is particularly geared to a preset period of time. In this case, following the transmission of drive power via the intermediate gear, the target gear may already have been engaged, should the target gear not lie in the same transmission unit as the intermediate gear. Nevertheless, the transfer of drive power from the power transmission branch of the intermediate gear to the power transmission branch of the target gear may not happen unless a second shift signal is derived from the actuation of a control element within the preset period of time.

It is furthermore advantageous if the gearshift actuator device comprises a first shift drum for engaging and disengaging gears of the first transmission unit and a second shift drum for engaging and disengaging gears of the second transmission unit, the original gear being assigned to one of the two transmission units and the intermediate gear being assigned to the other transmission unit.

In the case of such a gearshift actuator device the shift drums can preferably be actuated independently of one another.

In this case, in the event of a multiple downshift, the intermediate gear is preferably selected so that the intermediate gear does not lie in the same transmission unit as the original gear but in the other transmission unit. Consequently, the intermediate gear can preferably be engaged so that only one transfer of drive power from the original gear power transmission branch to the intermediate gear power transmission branch is necessary. Prior to this transfer of drive power it may be necessary to engage the intermediate gear in the transmission unit assigned to the intermediate gear, if this has not yet been engaged.

Consequently, prior to the step of closing the friction clutch corresponding to the intermediate gear, the step of selecting the intermediate gear preferably involves the engagement of the intermediate gear in the assigned transmission unit, if the intermediate gear is not already engaged.

In a further preferred embodiment, the target gear is assigned to the same transmission unit as the original gear, the target gear in that transmission unit being engaged after the opening of the friction clutch corresponding to the original gear, in order to be able to open the friction clutch corresponding to the intermediate gear and to close the friction clutch corresponding to the target gear with little delay should the second shift signal be derived.

In an alternative development, the target gear is assigned to the same transmission unit as the intermediate gear, the disengagement of the original gear in the transmission unit assigned to the original gear being followed by the engagement of a stopgap gear situated between the intermediate gear and the target gear, the friction clutch corresponding to the intermediate gear being opened and the friction clutch corresponding to the stopgap gear being closed should the second shift signal be derived, the target gear being engaged following the disengagement of the intermediate gear, and the friction clutch corresponding to the stopgap gear then being opened and the friction clutch corresponding to the target gear being closed.

In this embodiment, following the derivation of the second shift signal the target gear is consequently engaged, whilst the drive power is first transferred from the intermediate gear power transmission branch to the other power transmission branch, to which the stopgap gear is assigned. Finally, drive power is in turn transferred from the stopgap gear power transmission branch to the target gear power transmission branch.

In an alternative embodiment, the gearshift actuator device comprises one shift drum for engaging and disengaging gears of the first and second transmission.

In this embodiment, gear changes can only be performed purely sequentially, so that in the event of a downshift from the gear 7 into the gear 3, for example, it is generally necessary in the interim to engage the gear 6, the gear 5 and the gear 4.

Even in this embodiment it is advantageous, however, if the sequential shift sequence is not always performed right through to the target gear, once a first shift signal has been calculated, but rather only if a second shift signal can be derived, which, as it were, "confirms" the target gear.

A control element, from the actuation of which the first and/or second shift signal can be derived, may be the accelerator pedal of the motor vehicle, for example.

In this embodiment, it is preferred if the first and/or second shift signal is derived from the travel of the accelerator pedal and/or from a first and/or second time derivative of the travel of the accelerator pedal.

In other words, the first shift signal and/or the second shift signal is/are derived from the accelerator pedal travel and/or from a manner in which the accelerator pedal is actuated (that is to say rapidly or slowly, for example). The incorporation of the travel of the accelerator pedal may include, for example, the fact that a kickdown switch is actuated. The kickdown switch may be a mechanical switch, which is coupled to the accelerator pedal. The travel of the accelerator pedal is preferably measured, however, and the kickdown switch is backed by a threshold value comparison in the control device.

Here the second shift signal may be achieved, for example, by a second kickdown switch, that is to say by a second threshold value, for example, which differs from the first kickdown threshold value. In other words, the second shift signal might be derived only if the driver has depressed the accelerator pedal so far that both the first and the second threshold values are exceeded. Alternatively or in addition to this, the speed of the accelerator pedal movement may also be incorporated; that is to say whether this is depressed briskly or hesitantly. If the speed of movement of the accelerator pedal exceeds a speed threshold value, for example, this may lead to both the first and the second shift signal being derived from this, that is to say to the target gear being engaged anyway. If, on the other hand, the speed of the actuation of the accelerator pedal remains below such a threshold value, this can preferably be interpreted so that the second shift signal is not triggered or derived.

According to an especially preferred embodiment, the first shift signal is derived if a kickdown switch coupled to the accelerator pedal of the motor vehicle is actuated, the second shift signal being derived if the kickdown switch is actuated for a second time within a preset period of time.

The preset period of time may be less than two seconds, for example, preferably less than one second.

The kickdown switch may be a mechanical switch or, as described above, a software switch by means of a kickdown threshold value.

The second actuation of the kickdown switch consequently includes the driver easing back at least somewhat on the accelerator pedal after the first kickdown and then depressing it again.

In a further variant it is possible to derive the second shift signal from an actuation of the gear selector switch. In this variant the first shift signal is preferably derived via a mechanical or software kickdown switch, and the second shift signal can be derived here from an actuation of a gear selector lever, for example, which in particular is a downshift or an upshift gear selector switch, that is to say, for example, a shifter on the steering wheel or a shift lever in an upshift and downshift gutter of an automatic gear.

It is furthermore feasible, on the whole, for the first and/or the second shift signal to be derived from an actuation of a brake pedal of the motor vehicle.

Thus it is possible to take into account, for example, whether the brake pedal is actuated heavily or lightly, that is to say in particular at a high speed or low speed. In the case of a high speed, for example, the first and the second shift could be derived at once, whereas at a low shift speed only the first shift signal is derived. The travel of the brake pedal and/or time derivatives thereof may consequently also be used in order to derive the first and/or the second shift signal.

The invention can also be described as follows: instead of a direct multiple downshift with an extremely long overall shift time, the shifting can be divided into two gear shifts, that is firstly into the intermediate gear and then into the target gear. This first gear shift into the intermediate gear occurs with a substantially smaller time delay, substantially more torque already being available than in the original gear. Only when the driver requires more torque and for this purpose actuates the control element so that the second shift signal can be derived does the further downshift into the target gear ensue.

The invention can be used, in particular, where the dual-clutch transmission comprises more than five forward gears, in particular more than six forward gears, since this can lead to significantly prolonged overall gearshift times, particularly in the case of dual-clutch transmissions actuated by shift drums.

The comfort for the driver is also thereby increased, since the overall effect of this method according to the invention is not to select the lowest possible gear immediately that multiple downshifting is called for (for example owing to a kickdown). Accordingly, an abrupt rise in the engine speed is avoided in the event of a kickdown, thus producing an altogether more harmonious behaviour of the motor vehicle. Only when the actuation of a control element leads to the derivation of the second shift signal is the target gear engaged (here preferably the lowest possible gear).

Consequently, the method according to the invention can be used not only in shift-drum actuated dual-clutch transmissions but also in dual-clutch transmissions, the gearshift actuator device of which, for example, comprises hydraulic shift cylinders or the like and in which direct multiple downshifting would therefore generally be possible.

The method according to the invention can generally also be used in torque-converter transmissions, and in automated shift transmissions (AST).

It goes without saying that the features specified above and those yet to be explained below can be used not only in the particular combination specified but also in other combinations or in isolation without departing from the scope of the present invention.

BRIEF DESCRIPTION OF THE DRAWINGS

Exemplary embodiments of the invention are represented in the drawings and are explained in more detail in the following description. In the drawings:

FIG. 1 shows a schematic representation of one embodiment of a drivetrain for performing the control method according to the invention;

FIG. 2 shows an axial schematic top view of two shift drums of the dual-clutch transmission;

DESCRIPTION OF PREFERRED EMBODIMENTS

Figure 3:
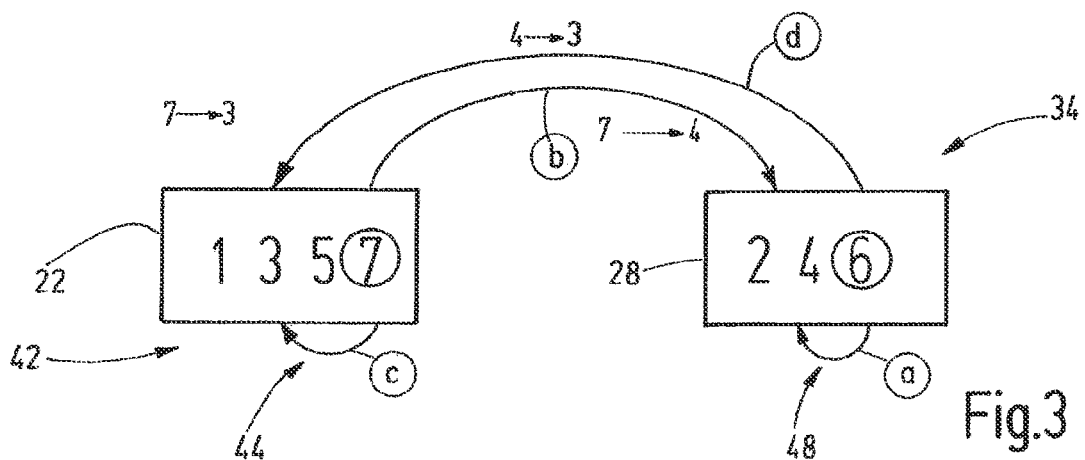
FIG. 3 shows a schematic representation of the control method according to the invention in the case of a downshift 7→3.

FIG. 1 in schematic form shows a drivetrain for a motor vehicle for a passenger car, the drivetrain being denoted generally by 10. The drivetrain 10 comprises a drive engine 12 such as an internal combustion engine or a hybrid drive unit, a dual-clutch transmission 14 and a differential 16, by means of which drive power can be distributed to driven wheels 18L, 18R of the motor vehicle.

The dual-clutch transmission 14 comprises a first friction clutch 20 and a first transmission unit 22, which form a first power transmission branch 24. The first transmission unit 22 contains forward gears 1, 3, 5, 7. The dual-clutch transmission 14 further comprises a second friction clutch 26 and a second transmission unit 28, which form a second power transmission branch 30. The second transmission unit 28 comprises the even forward gears 2, 4, 6 and possibly 8, and here preferably also comprises a reverse gear R.

The dual-clutch transmission 14 moreover comprises a clutch actuator device 34 having a first clutch actuator 36 and a second clutch actuator 38. The clutch actuators 36, 38 are controlled by a control device 40 and serve to open/close the friction clutches 20, 26 or to set them into a slipping state. The clutch actuators 36, 38 may be electromechanical or hydraulic actuators.

The dual-clutch transmission 14 further comprises a gearshift actuator device 42 for engaging and disengaging the gears of the dual-clutch transmission 14. The gearshift actuator device 42 comprises a first shift drum 44, which is driven by a first electric motor 46, and a second shift drum 48, which is driven by a second electric motor 50.

The first shift drum 44 serves for engaging and disengaging the gears of the first transmission unit 22. The second shift drum 48 serves for engaging and disengaging the gears of the second transmission unit 28.

The first shift drum 44 comprises here at least one shift contour (not denoted further), and the gears activated thereby are arranged on the shift drum 44 distributed in a circumferential direction, as represented in FIG. 2. The second shift drum 48 correspondingly comprises at least one circumferential or shift contour, the gears of the second transmission unit 28 likewise being distributed over the circumference, as is also represented in FIG. 2.

Instead of two shift drums 44, 48, which can preferably be actuated independently of one another, the gearshift actuator device 42 may also comprise a single shift drum for actuating all gears of the dual-clutch transmission 14, as is indicated by 54 in FIG. 1. In this case a single electric motor 56 serves to drive the single shift drum 54.

FIG. 1 further shows that the control device 40 receives a signal from an accelerator pedal 60 and from a brake pedal 62. For this purpose suitable sensors, such as travel sensors, for example, which measure the travel s of the accelerator pedal 60, for example, and relay this to the control device 40, are assigned to the accelerator pedal 60 and the brake pedal 62. Furthermore, the control device 40 may be connected to a gear selector lever, which is indicated at 64, in particular to a downshift lever 64, which is adjustably supported in a center console, for example, or a shifter which is arranged on a steering wheel.

The drivetrain 10 is usually operated in the conventional way. That is to say the drive power is transmitted via a power transmission branch 24 or 30 at any one time. A gear is preselected in the other power transmission branch. The drive power can then be transferred to the other power transmission branch by overlapping actuation of the friction clutches 20, 26, so that gear changes can be performed without any interruption in tractive force.

In dual-clutch transmissions, the gearshift actuator device of which comprises one or two shift drums, multiple downshifting, as is triggered by means of a so-called kickdown in conventional dual-clutch transmissions, for example, may take a relatively long time.

It is proposed here to perform such multiple downshifting in two stages, starting from an original gear and first engaging an intermediate gear. Only when a "confirmation" is generated by means of a second shift signal, indicating that the driver would actually like to shift not only into the intermediate gear but into the yet lower target gear, is the second step also performed, in which the intermediate gear is deselected and the target gear engaged. Such multiple downshifts, for example, are explained below with reference to FIGS. 3 to 10. In each of the FIGS. 3 to 10 the first and the second transmission unit 22, 28 are represented schematically. Gear changes in one or the other transmission unit are in each case furthermore represented schematically below each of the transmission units. Changes from one power transmission branch to the other power transmission branch are represented above each of the transmission units, the associated friction clutches in each case being actuated with an overlap.

FIG. 3 shows a multiple downshift from an original gear 7 into a target gear 3. Here in step a) an intermediate gear 4 is first engaged in the second transmission unit 28. Then in step b) the power is transferred to the other power transmission branch, so that drive power is fed to the driven wheels via the intermediate gear 4. Only when a second shift signal is derived from an actuation of a control element, such as an accelerator pedal, by the driver (or actuation of the brake pedal 62 and/or actuation of the gear selector lever 64) is the target gear 3 engaged in the first transmission unit 22 (step c)) and the power transferred back to the first power transmission branch, as is shown at d), so that drive power is then transmitted to the driven wheels via the target gear 3.

Following step b), step c) of engaging the target gear can ensue without inevitably transferring power in step d). As stated, the transfer of power in step d) ensues only when the second shift signal is derived or is calculated from an actuation of the control element by the driver.

Figure 4:
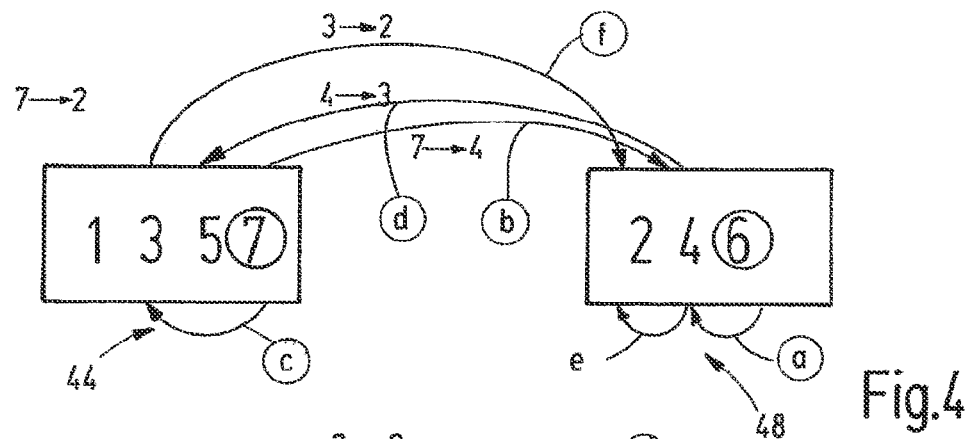
FIG. 4 shows a schematic representation of the control method according to the invention in the case of a downshift 7→2.

FIG. 4 shows a multiple downshift from an original gear 7 into a target.

Steps a) to d) are identical to the preceding method. Here, however, the gear 3 engaged at the end of step d) and used to transmit power is only a stopgap gear, since in this case the intermediate gear and the target gear are situated in the same transmission unit 28 and consequently a direct change from the gear 4 into the gear 2 would only be possible with an interruption of the tractive force. Through the interim engagement of the stopgap gear, however, it is possible to avoid any interruption of the tractive force. Consequently, following step d), that is to say after transferring the drive power to the power transmission branch containing the gear 3, in step e) the target gear 2 is engaged in the second transmission unit and in step f) the power is again transmitted to the second power transmission branch containing the gear 2.

Figure 5:
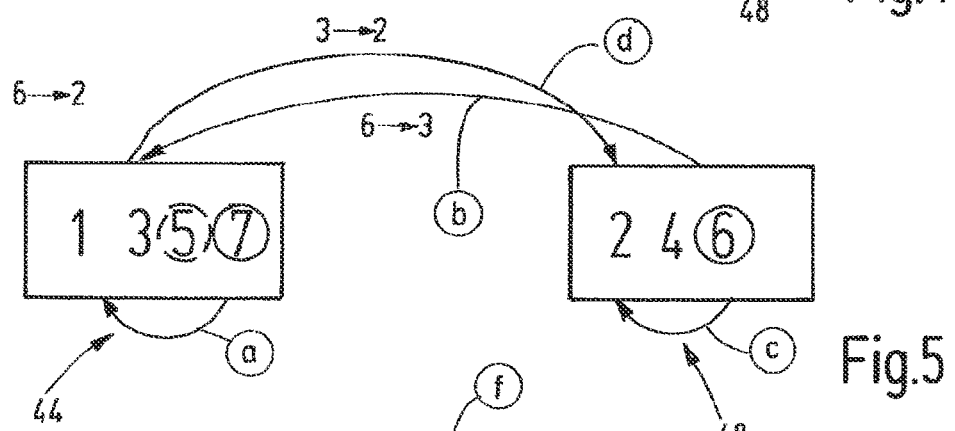
FIG. 5 shows a schematic representation of the control method according to the invention in the case of a downshift 6→2.

FIG. 5 shows a method for downshifting from an original gear 6 into a target gear 2. The method corresponds generally to the method in FIG. 3, starting from the original gear 6 and first engaging the intermediate gear 3 in the other transmission unit (step a)). Drive power is then transferred to the first transmission unit, so that drive power can be transmitted via the intermediate gear 3. After opening the friction clutch of the second transmission unit, the target gear 2 can be engaged there (step c)), before then finally transmitting the power to the second transmission unit again in step d) (should the second shift signal be derived), so that drive power is transmitted via the target gear 2.

Figure 6:
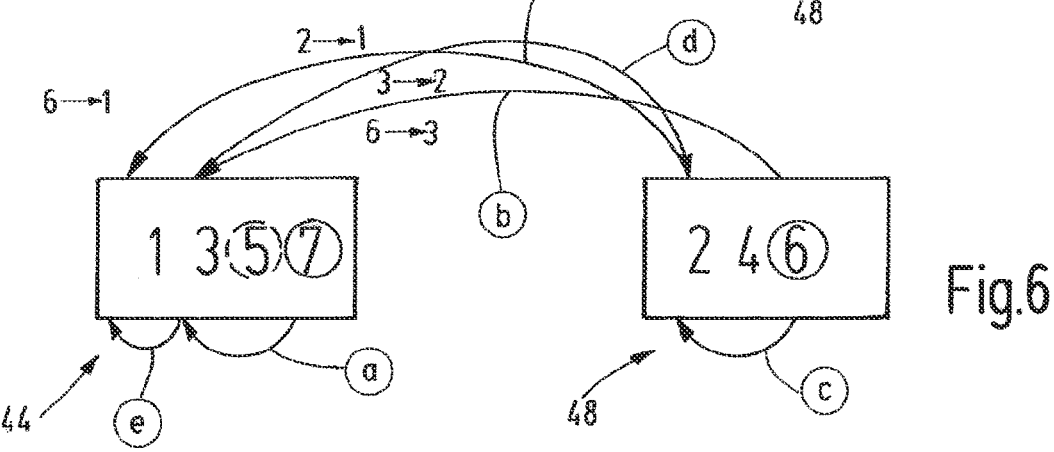
FIG. 6 shows a schematic representation of the control method according to the invention in the case of a downshift 6→1.

FIG. 6 shows a multiple downshift from the original gear 6 into the target gear 1. In terms of the sequence, the method corresponds generally to the method in FIG. 4. Here too, an intermediate gear 3 is first engaged, and only after derivation of the second shift signal is the target gear 1 engaged, the gear 2 in the meantime being engaged as stopgap gear.

Figure 7:
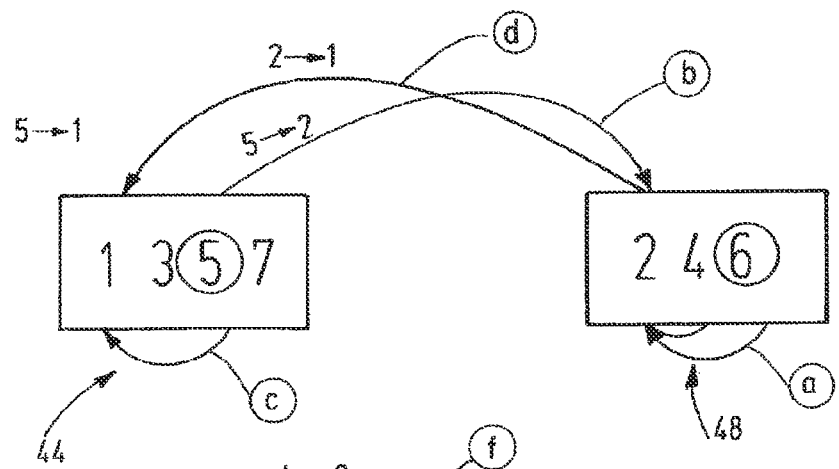
FIG. 7 shows a schematic representation of the control method according to the invention in the case of a downshift 5→1.

FIG. 7 shows a multiple downshift process from the original gear 5 into the target gear 1. In its principle, the method again corresponds generally to the method in FIGS. 3 and 5. The gear 2 is first engaged as intermediate gear in the second transmission unit (step a)). Then power is transferred to the second transmission unit. Next the target gear 1 is engaged in the transmission unit of the original gear 5, and when the second shift signal is derived, the power is again transmitted to the first transmission unit so as to be able in this way to transmit drive power via the target gear 1.

Figure 8:
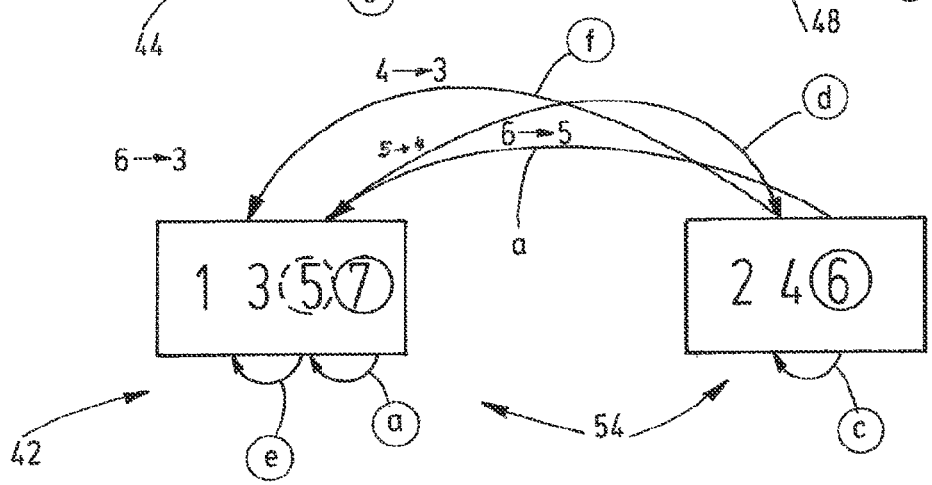
FIG. 8 shows a schematic representation of a control method according to the invention in the case of a downshift 6→3, the dual-clutch transmission being actuated by means of just one shift drum.

FIG. 8 shows a downshifting process from the original gear 6 into the target gear 3, a dual transmission having only one shift drum 54 being used here. The gear change here is purely sequential, so that in step a) the gear 5 is first engaged, if this has not yet been engaged. In step b) the power is then transmitted to the first transmission unit, so that drive power is transmitted via the gear 5. Furthermore, in step c) the gear 4 is then engaged in the second transmission unit and in step d) the power is then transferred from the first to the second transmission unit, so that power is transmitted via the gear 4. In step e) the target gear 3 is then engaged in the first transmission unit, and in step f) the power is finally transmitted to the first transmission unit again, in order to be able to transmit power via the target gear.

In this method both the gear 5 and the gear 4 may represent an intermediate gear for the purposes of the present invention. If the intermediate gear is the gear 5, then the gear 4 is a stopgap gear. If the intermediate gear is the gear 4, in contrast to the method above it is necessary, starting from the original gear, to perform two overlapping actuations of the friction clutches (step b) and d)) in order to engage the intermediate gear. In the method above, only one overlapping actuation of friction clutches is generally necessary in order to engage the intermediate gear.

Figure 9:
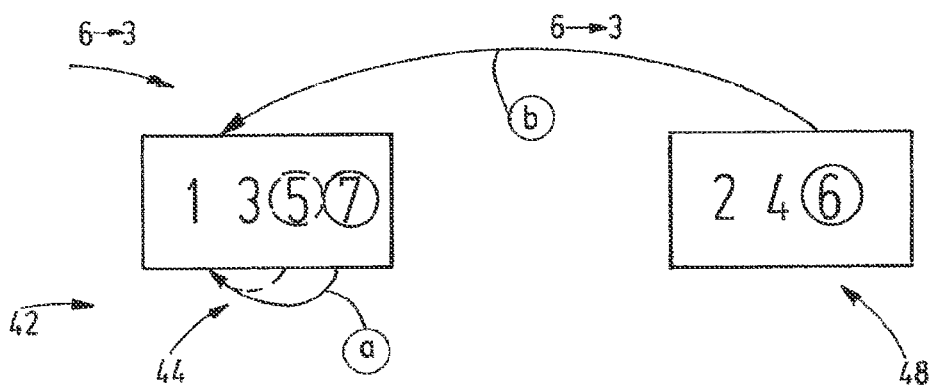
FIG. 9 shows a schematic representation of a control method according to the invention in the case of a downshift 6→3, the gearshift actuator device comprising two shift drums, so that a direct, multiple downshift is possible.

FIG. 9 by comparison shows how a multiple downshift from an original gear 6 to target gear 3 can be performed in a dual-clutch transmission, which comprises two shift drums 44, 48. In this case the third gear is simply engaged in the first transmission unit (step a)), and the power is then transferred to the first transmission unit (step b)).

In this case it is therefore not necessary to perform the method according to the invention.

Figure 10:
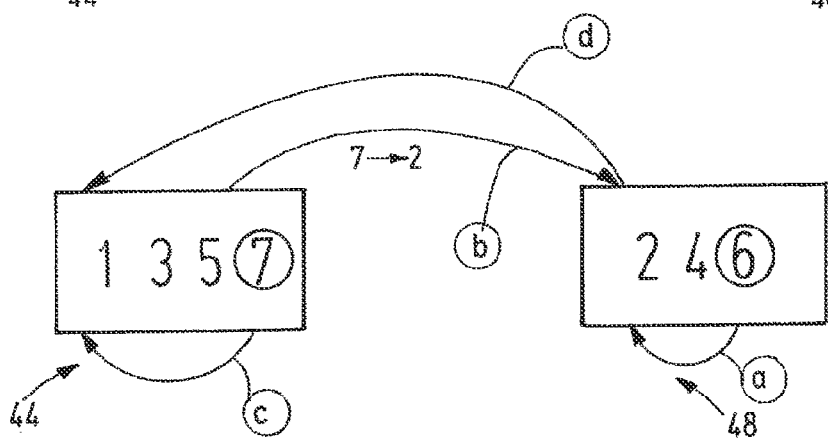
FIG. 10 shows a representation of a downshift process 7-1 (for example due to a braking process)

Finally FIG. 10 shows a downshifting process from an original gear 7 into a target gear 1, for example in a heavy braking process. Here too, in step a) the intermediate gear 2 is first engaged in the second transmission unit, and in step b) the power is transmitted to the second transmission unit. Only when the second shift signal is derived is the target gear 1 engaged in the first transmission unit (step c)), and the power transferred from the second to the first transmission unit (step d)). In any event the step d) here is only executed when the second shift signal is also actually derived.

Figure 11:
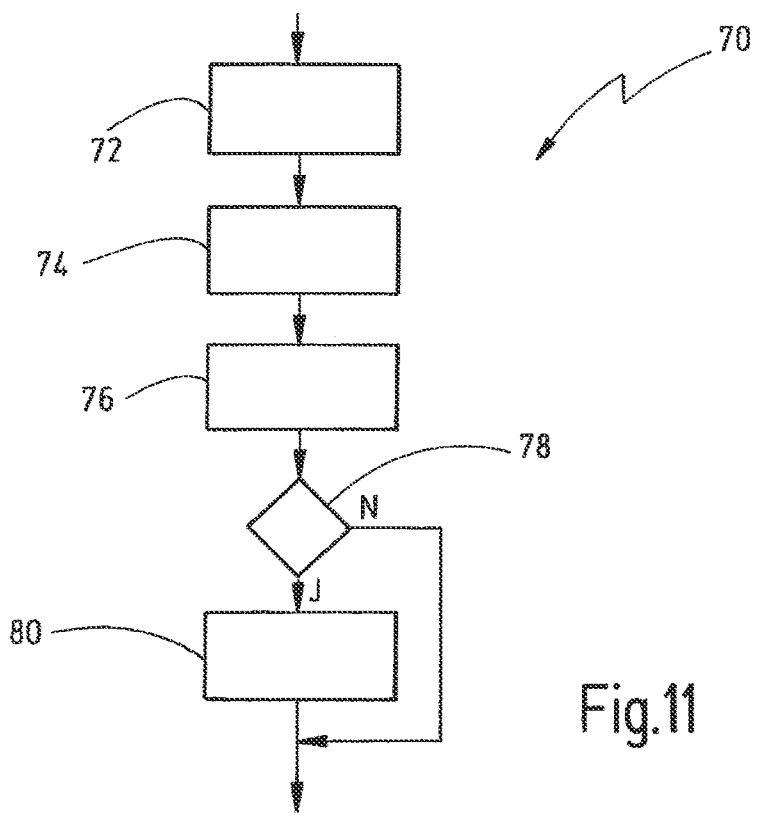
FIG. 11 shows a flow chart with a schematic representation of the control method according to the invention.

FIG. 11 in schematic form shows a flow chart 70 of a control method according to the invention.

In a first step 72 a first shift signal, for example a kickdown signal, is derived from an actuation of a control element performed by the driver.

In step 74 a target gear is then calculated, which is lower than the original gear and which corresponds to the first shift signal. This is preferably the lowest possible gear that can be engaged in the prevailing driving condition.

In step 76 an intermediate gear between the original gear and the target gear is then selected, the friction clutch corresponding to the original gear is opened and the friction clutch corresponding to the intermediate gear is closed, in order to transmit drive power via the power transmission branch corresponding to the intermediate gear.

In step 78 it is queried whether a second shift signal has been derived, which originates from an actuation of a control element by the driver. If this is not the case or if this is not the case after a predefined period of time, the method terminates and the driver continues to drive in the intermediate gear.

In the event of a positive response to the query 78, the target gear is engaged, the friction clutch corresponding to the intermediate gear is opened and the friction clutch corresponding to the target gear is closed, in order to then transmit drive power via the target gear, step 80.

Figure 12:
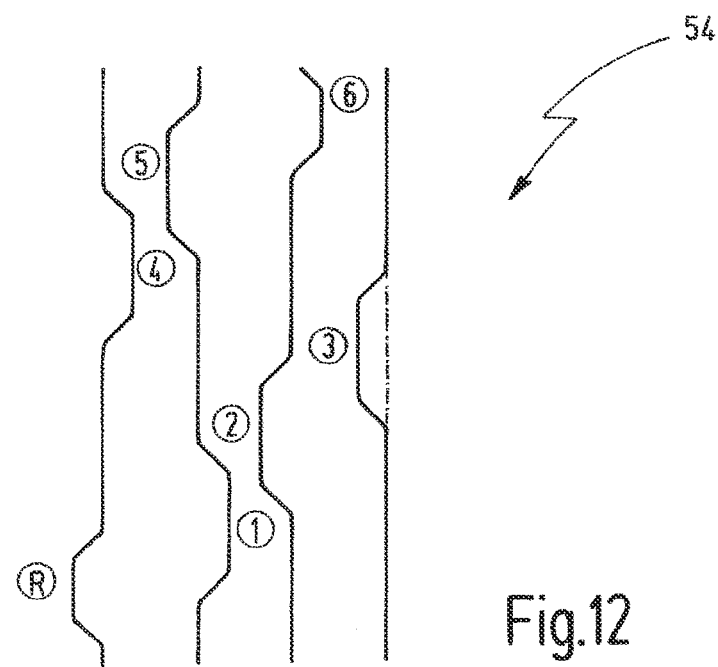
FIG. 12 shows a developed view of a shift drum, which can be used for actuating two transmission units of a dual-clutch transmission.

FIG. 12 shows a schematic developed view of a single shift drum 54 for shifting all gears of the dual-clutch transmission. The shift drum 54 comprises four shift cams, which correspond to respective shift clutch assemblies for the gears R, 4 or 1, 5 or 2, 6 or 3. The shift cams partially overlap one another in a circumferential direction, so that adjacent gears can be engaged simultaneously, thereby allowing transfers of drive power from the one power transmission branch to the other power transmission branch to be performed without any interruption in tractive force.

Figure 13:
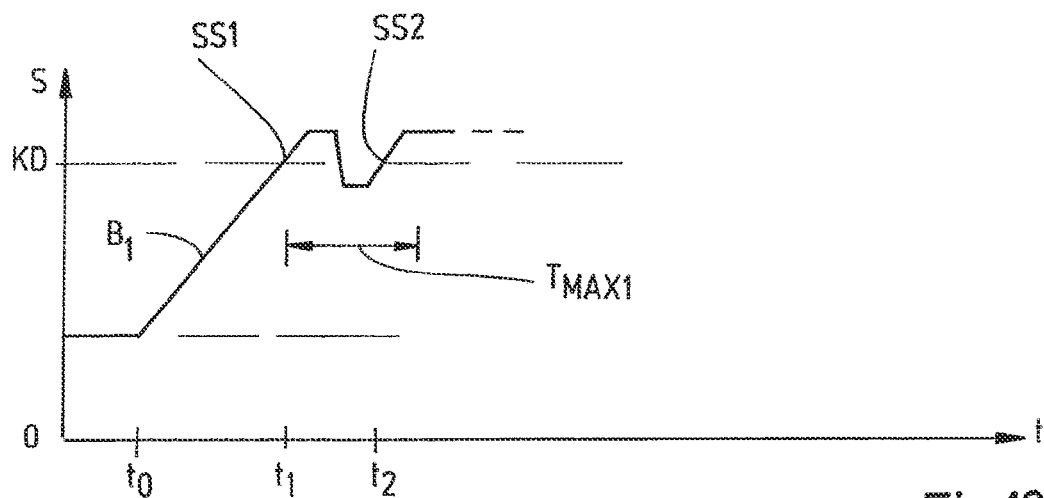
FIG. 13 shows a schematic time sequence of an actuation of a control element in a motor vehicle over time.
Figure 14:
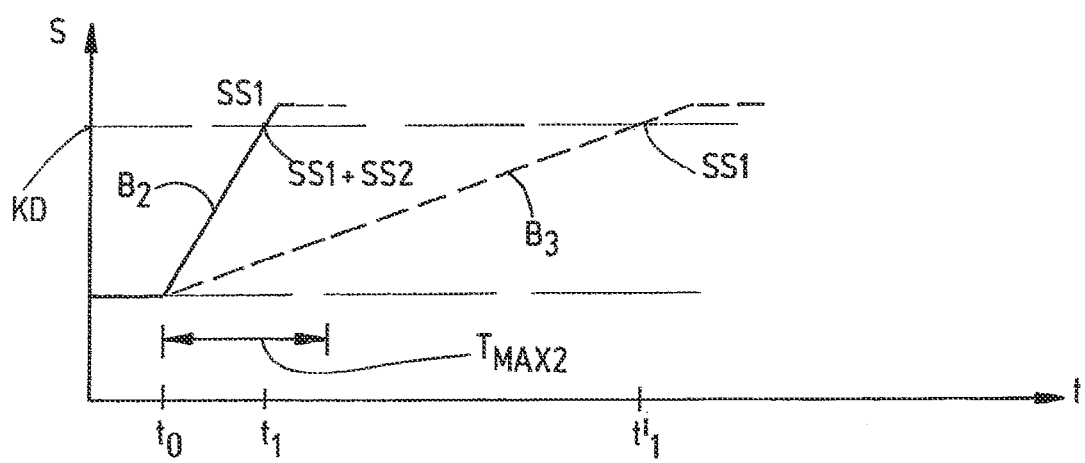
FIG. 14 shows a representation, corresponding to FIG. 13, of further variants of control element actuations.
Figure 15:
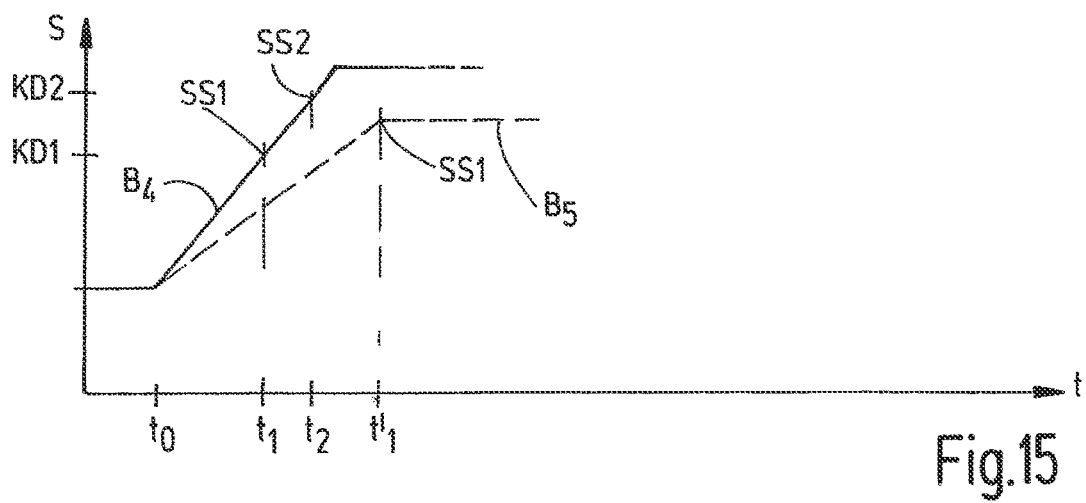
FIG. 15 shows a representation, corresponding to FIGS. 13 and 14, of further variants of actuations of a control element.

FIGS. 13 to 15 show schematic representations of exemplary methods for actuating a control element, here taking as an example an actuation of an accelerator pedal, the adjustment travel of which is entered at s. In each of the three FIGS. 13 to 15, a control method according to the invention assumes a driving mode in which the accelerator pedal is depressed to a certain degree, so that it is possible to drive in a high original gear. At a time $t_0$ in each case an actuation of the accelerator pedal then ensues, the actuations in each case being denoted by $B_1$ to $B_5$.

In the example in FIG. 13 an actuation is shown, in which the accelerator pedal exceeds a threshold value KD (kickdown) at a time $t_1$. This leads to the derivation of the first shift signal SS1. The driver then releases the accelerator pedal again somewhat, taking it below the threshold value KD again, and then the threshold value KD is once again exceeded, which triggers or allows the derivation of a second shift signal SS2. Here the successive exceeding of the threshold value KD must occur within a predefined period of time $T_{MAX1}$.

FIG. 14 shows an embodiment in which both shift signals SS1 and SS2 are triggered when, starting from the driving condition at time $t_0$, the threshold value KD is reached in a very short time $T_{MAX2}$. In FIG. 14 this type of actuation is denoted by $B_2$. If the threshold value KD is reached only after the time $T_{MAX2}$, on the other hand, which is represented by $B_3$ in FIG. 14, only the first shift signal SS1 is triggered on reaching the threshold value KD. This may be followed by the query as to whether a renewed actuation of the accelerator pedal or a renewed exceeding of the threshold value KD ensues with the period of time $T_{MAX1}$ as shown in FIG. 13.

Instead of a comparison with a time $T_{MAX2}$, a time derivative of the travel s of the accelerator pedal may also be used directly as a basis for calculation in determining the shift signals SS1, SS2.

FIG. 15 shows a further embodiment, in which two threshold values KD1 and KD2 can be set by way of the accelerator pedal travel s. If the first threshold value KD1 is exceeded, only the first shift signal SS1 is generally triggered. Only when the second threshold value KD2 is exceeded is the second shift signal SS2 triggered, as is shown for the type of actuation $B_4$.

If, on the other hand, after triggering of the shift signal SS1, the accelerator pedal remains in a position short of the second threshold value KD2, as is shown by $B_5$ in FIG. 15, the second shift signal SS2 is not triggered.

The invention claimed is:

1. Method for controlling a drivetrain of a motor vehicle, which comprises a drive engine and a dual-clutch transmission, the dual-clutch transmission comprising a first friction clutch and a second friction clutch together with a first transmission unit and a second transmission unit, in order to establish a first power transmission branch and a second power transmission branch, the dual-clutch transmission comprising a clutch actuator device for actuating the friction clutches and a gearshift actuator device for engaging and disengaging gears of the dual-clutch transmission, said method assuming that the motor vehicle is being driven in a high original gear and comprising the following steps:

derivation of a first shift signal from an actuation of a control element by the driver;
calculation of a target gear, which is lower than the original gear and which corresponds to the first shift signal;
selection of an intermediate gear between the original gear and the target gear, opening of the friction clutch corresponding to the original gear and closing of the friction clutch corresponding to the intermediate gear, in order to transmit drive power via the power transmission branch corresponding to the intermediate gear; and
engagement of the target gear, opening of the friction clutch corresponding to the intermediate gear and closing of the friction clutch corresponding to the target gear in the event that a second shift signal is derived from an actuation of a control element by the driver.

2. Control method according to claim 1, wherein, at least, the friction clutch corresponding to the intermediate gear is not opened and the friction clutch corresponding to the target gear is not closed, if no second shift signal is derived from an actuation of a control element by the driver within a preset period of time following the derivation of the first shift signal.

3. Control method according to claim 1, wherein the gearshift actuator device comprises a first shift drum for engaging and disengaging gears of the first transmission unit and a second shift drum for engaging and disengaging gears of the second transmission unit, and wherein the original gear is assigned to one of the two transmission units and the intermediate gear is assigned to the other transmission unit.

4. Control method according to claim 3, wherein prior to the step of closing the friction clutch corresponding to the intermediate gear, the step of selecting the intermediate gear involves the engagement of the intermediate gear in the assigned transmission unit, if the intermediate gear is not already engaged.

5. Control method according to claim 3, wherein the target gear is assigned to the same transmission unit as the original gear, and wherein after opening of the friction clutch corresponding to the original gear, the target gear is engaged in the one transmission unit, in order to be able to open the friction clutch corresponding to the intermediate gear and to close the friction clutch corresponding to the target gear with little delay should the second shift signal be derived.

6. Control method according to claim 3, wherein the target gear is assigned to the same transmission unit as the intermediate gear, the disengagement of the original gear in the transmission unit assigned to the original gear being followed by the engagement of a stopgap gear situated between the intermediate gear and the target gear, the friction clutch corresponding to the intermediate gear being opened and the friction clutch corresponding to the stopgap gear being closed should the second shift signal be derived, the target gear being engaged following the disengagement of the intermediate gear and the friction clutch corresponding to the stopgap gear then being opened and the friction clutch corresponding to the target gear being closed.

7. Control method according to claim 1, wherein the gearshift actuator device comprises one shift drum for engaging and disengaging gears of the first and second transmission units.

8. Control method according to claim 1, wherein at least one of the first and the second shift signal is derived from an actuation of an accelerator pedal of the motor vehicle.

9. Control method according to claim 8, wherein at least one of the first and the second shift signal is derived from at least one of the travel of the accelerator pedal and a first or second time derivative of the travel of the accelerator pedal.

10. Control method according to claim 8, wherein the first shift signal is derived if a kickdown switch coupled to the accelerator pedal of the motor vehicle is actuated, and wherein the second shift signal is derived if the kickdown switch is actuated for a second time within a preset period of time.

11. Control method according to claim 8, wherein the second shift signal is derived from an actuation of a gear selector switch.

12. Control method according to claim 1, wherein at least one of the first and the second shift signal is derived from an actuation of a brake pedal of the motor vehicle.

\* \* \* \* \*